United States Patent
Jahr (12)

(10) Patent No.: US 6,230,481 B1
(45) Date of Patent: May 15, 2001

(54) BASE FRAME FOR A GAS TURBINE

(75) Inventor: Knuth Jahr, Vinterbro (NO)

(73) Assignee: Kvaerner Energy a.s., Lysaker (NO)

( * ) Notice: Subject to any disclaimer, the term of this patent is extended or adjusted under 35 U.S.C. 154(b) by 0 days.

(21) Appl. No.: 09/403,725

(22) PCT Filed: Apr. 17, 1998

(86) PCT No.: PCT/NO98/00122

§ 371 Date: Jan. 7, 2000

§ 102(e) Date: Jan. 7, 2000

(87) PCT Pub. No.: WO98/50727

PCT Pub. Date: Nov. 12, 1998

(30) Foreign Application Priority Data

May 6, 1997 (NO) ........................................ 972078

(51) Int. Cl.$^7$ ........................................ F02C 7/20
(52) U.S. Cl. ........................................ 60/39.31; 248/678
(58) Field of Search ........................... 60/39.31, 39.33, 60/39.75; 248/678

(56) References Cited

U.S. PATENT DOCUMENTS 4,174,482  11/1979  Bollman .
4,317,556  * 3/1982  Dietrich ........................ 248/678
4,501,973  * 2/1985  Fenemore et al. ................ 60/39.31
4,694,190  * 9/1987  Lane et al. ..................... 248/678
5,626,468  * 5/1997  Muir et al. ..................... 248/678

FOREIGN PATENT DOCUMENTS 0 065 413  11/1982  (EP) .

* cited by examiner

*Primary Examiner*—Louis J. Casaregola
(74) *Attorney, Agent, or Firm*—Young & Thompson

(57) ABSTRACT

A base frame for a gas turbine and driven machinery such as generators and the like, includes a centrally arranged hollow section which acts as a torsion-absorbing body, sections or wings which extend from the hollow section and form an angle of approximately 90° with the longitudinal axis of the hollow profile, one or more plate-shaped bodies arranged to cover wholly or partly the hollow section and the sections, wherein between the plate-shaped bodies, the sections and the hollow section there is formed at least one chamber on each side of the longitudinal axis of the hollow section, in which chambers there are provided pull-out modules which can house operating and control systems for the gas turbine, and that the hollow section is in the form of a hollow section having a rectangular cross-section.

8 Claims, 5 Drawing Sheets

BASE FRAME FOR A GAS TURBINE

BACKGROUND OF THE INVENTION

The present invention relates to a base frame for a gas turbine and optional driven machinery such as generators and the like, which base frame includes a centrally arranged hollow section which acts as a torsion-absorbing body, sections or wings which extend from the hollow section and form an angle of approximately 90° with the longitudinal axis of the hollow section, one or more plate-shaped bodies arranged to cover wholly or partly the hollow section and the sections, where between the plate-shaped bodies, the sections and the hollow section there is formed at least one chamber on each side of the longitudinal axis of the hollow section.

DESCRIPTION OF THE RELATED ART

Gas turbines and optional driven machinery such as, e.g., generators, are often mounted together on base frames. This is especially true in the case of gas turbine installations on offshore oil platforms, where the gas turbine and the driven machinery can be mounted and dismounted as a unit. Around the gas turbine and the driven machinery there is usually provided an encasing housing having ventilation means or the like to maintain the temperature inside the housing within a desired range.

In such installations the torque between the gas turbine and the driven machinery is absorbed by the frame. This requires a robust frame structure and a frame of this kind is usually constructed in a different manner than a frame where the gas turbine and the driven machinery are arranged on separate frames, in such manner that the frame is not to absorb the torque.

In base frames which are to absorb torque, the frame is usually based on a round central tube which is to take up the torque or torsional forces.

A frame structure is known from inter alia EP 0 065 413, where a skid for rotating machinery is taught, consisting primarily of a torque-absorbing body in the form a round central tube, a so-called torsion tube.

U.S. Pat. No. 4,572,474 teaches a method of mounting a rotating machine and driven machinery on a base frame. However, this frame does not have a centrally positioned torque-absorbing body.

A disadvantage of a round central tube of this kind is that it involves the base frame having a relatively high constructional height, and also a relatively high weight, as a consequence of the necessary dimension to take up a desired torque.

All the equipment for controlling the operation of the gas turbine, the lubricating oil systems and feed devices for the gas turbine fuel are usually positioned on the top of the base frame, inside the housing. This positioning of the control and feed devices is disadvantageous from several points of view.

The fuel gas system is usually placed in an area in proximity to the high pressure turbine. If a blade becomes detached from the turbine, the blade will be thrown off and will penetrate the turbine housing and may also damage fuel gas valves and pipes. This may result in an explosion and fire.

A result of positioning the fuel gas system inside the housing is that the components are exposed to radiant heat from the turbine. This makes heavy demands on the temperature resistance of the components, which makes the fuel gas system more expensive.

In the event of an emergency shutdown of the turbine in a possible fire situation, the air dampers are usually closed preventing ventilation air from entering the housing, and the temperature inside the housing may thus increase to a level where cables and components are destroyed and where lubricating oil and hydraulic oil may convert to coke in the pipes.

In connection with fire classification of a turbine package, there are requirements with respect to the maximum number of mechanical pipe connections and joints. These requirements may be difficult to meet, because the pipe connections and joints must be welded, and this is also disadvantageous from a maintenance point of view.

Another major drawback with the conventional position of the fuel gas and lubricating oil systems is that there is no access for inspection when the turbine is in operation.

SUMMARY OF THE INVENTION

The object of the present invention is primarily to solve the aforementioned problems.

Another object of the invention is to move the fuel gas system away from the area where it may be exposed to damage as a result of detached turbine blades striking parts of the fuel gas system. The risk of explosion and fire is thus also reduced.

Another object of the present invention is to eliminate the temperature problems which may arise as a result of radiant heat from the turbine under normal operations and especially the temperature problems which may occur as a result of an emergency shutdown of the turbine.

This is achieved with a base frame for a gas turbine and optional driven machinery such as generators and the like, which base frame includes a centrally arranged hollow section which acts as a torsion-absorbing body, sections or wings which extend from the hollow section and form an angle of approximately 90° with the longitudinal axis of the hollow section, one or more plate-shaped bodies arranged to cover wholly or partly the hollow section and the sections, where between the plate-shaped bodies, the sections and the hollow section there is formed at least one chamber on each side of the longitudinal axis of the hollow section, characterised in that in said chambers there are provided pull-out modules which can house operating and control systems for the gas turbine, and that the hollow section is in the form of a hollow section having a rectangular, preferably square cross-section.

The chambers are preferably provided with rails and the modules are provided with wheels or similar sliding or rolling devices which interact with the rails.

The chambers are preferably mechanically ventilated to a minimum of 90 air changes per hour.

The operating and control systems which are arranged in the modules are preferably connected to the gas turbine by means of quick release couplings.

The gas turbine and the driven machinery are located on the same base frame, or they may be located on separate base frames.

The hollow section preferably extends throughout the entire length of the base frame.

BRIEF DESCRIPTION OF THE DRAWINGS

The invention will be described in more detail below, with the aid of exemplary embodiments with reference to the accompanying drawings.

DESCRIPTION OF THE PREFERRED EMBODIMENTS

Figure 1:
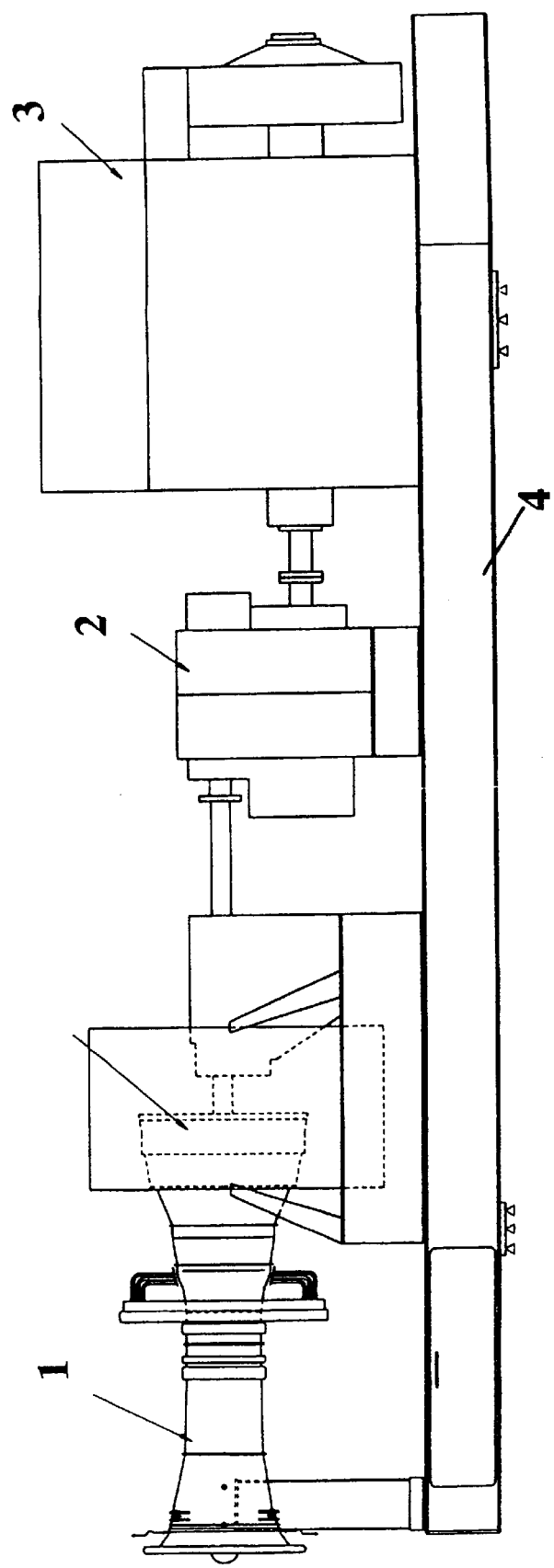
FIG. 1 shows a gas turbine with driven machinery placed on a frame according to the present invention.
Figure 2:
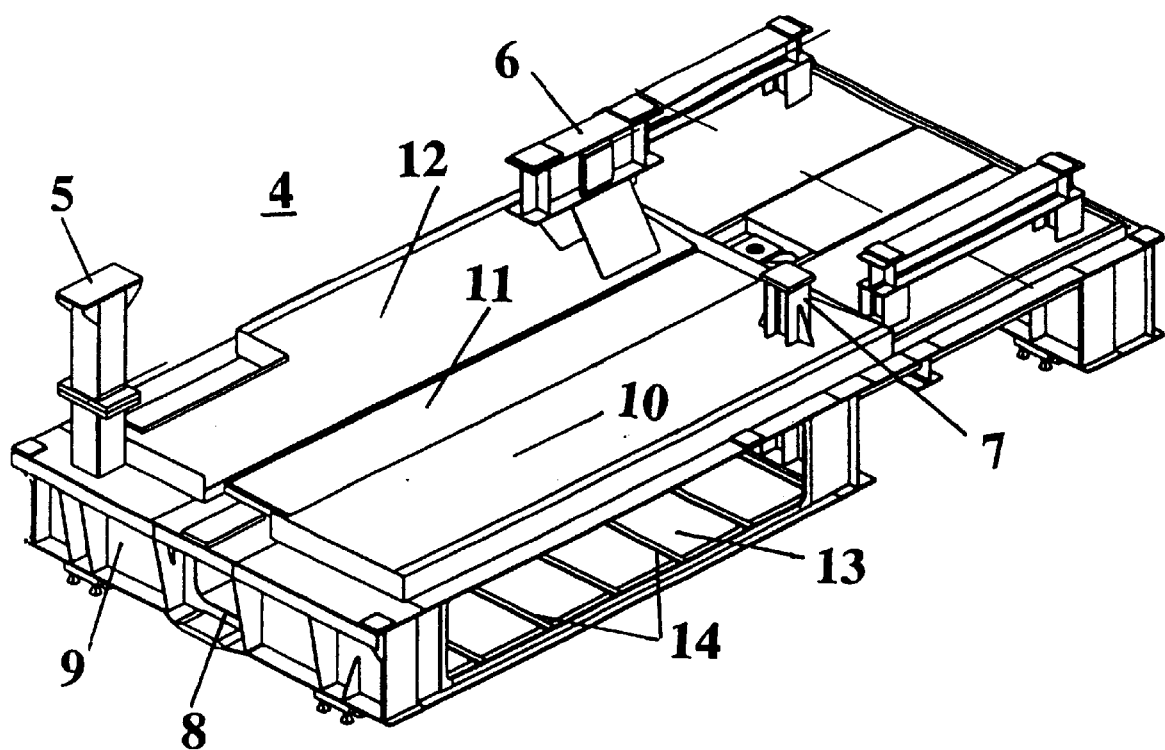
FIGS. 2 and 3 are respectively a perspective view and an end view of a base frame according to the invention.

FIG. 1 shows a gas turbine 1, gear means 2 and driven machinery 3, e.g., in the form of a generator, which are placed on a base frame, generally indicated as 4. The gas turbine 1 is usually supported in three support points 5, 6 and 7, respectively (FIG. 2). This is usually described as a three-point single lift skid.

The base frame 4 consists of a centrally located rectangular hollow section 8, which runs throughout the entire length of the frame. The use of a rectangular hollow section instead of a round one results in lower constructional height and savings in weight in comparison with the known base frames.

From the hollow section 8 there extends a number of sections or "wings" 9, which are secured to the hollow section 8 and form an angle of approximately 90° with the longitudinal direction of the hollow section 8. The support points 5, 6, and 7 are secured to these sections or wings 9.

One or more plates 10, 11 and 12, which wholly or partly cover the top of the base frame 4, are provided on top of the base frame 4. The purpose of these plates will be described in more detail below.

Figure 5:
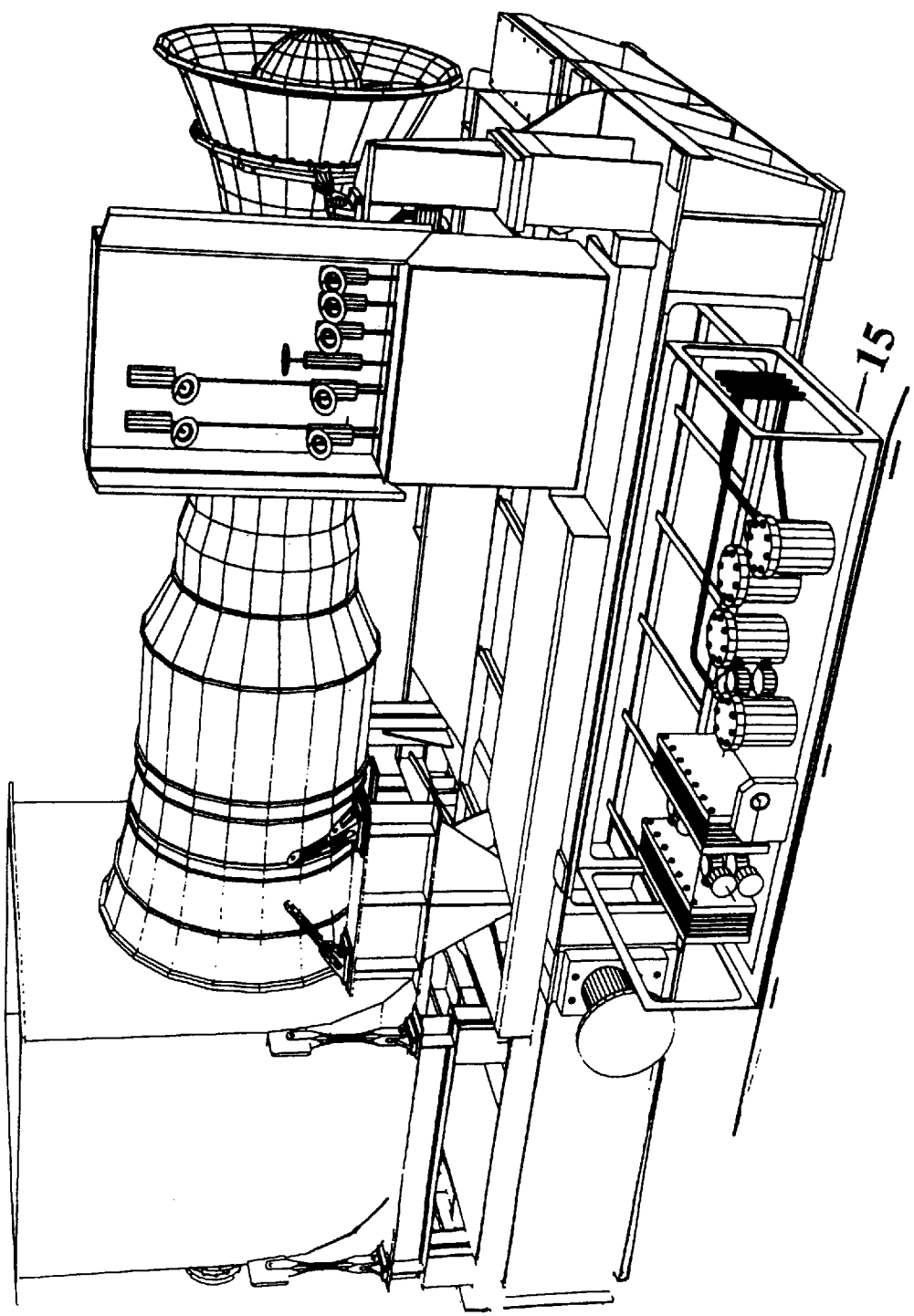
FIGS. 5 and 6 show different arrangements of fuel gas and hydraulic units according to the present invention.
Figure 6:
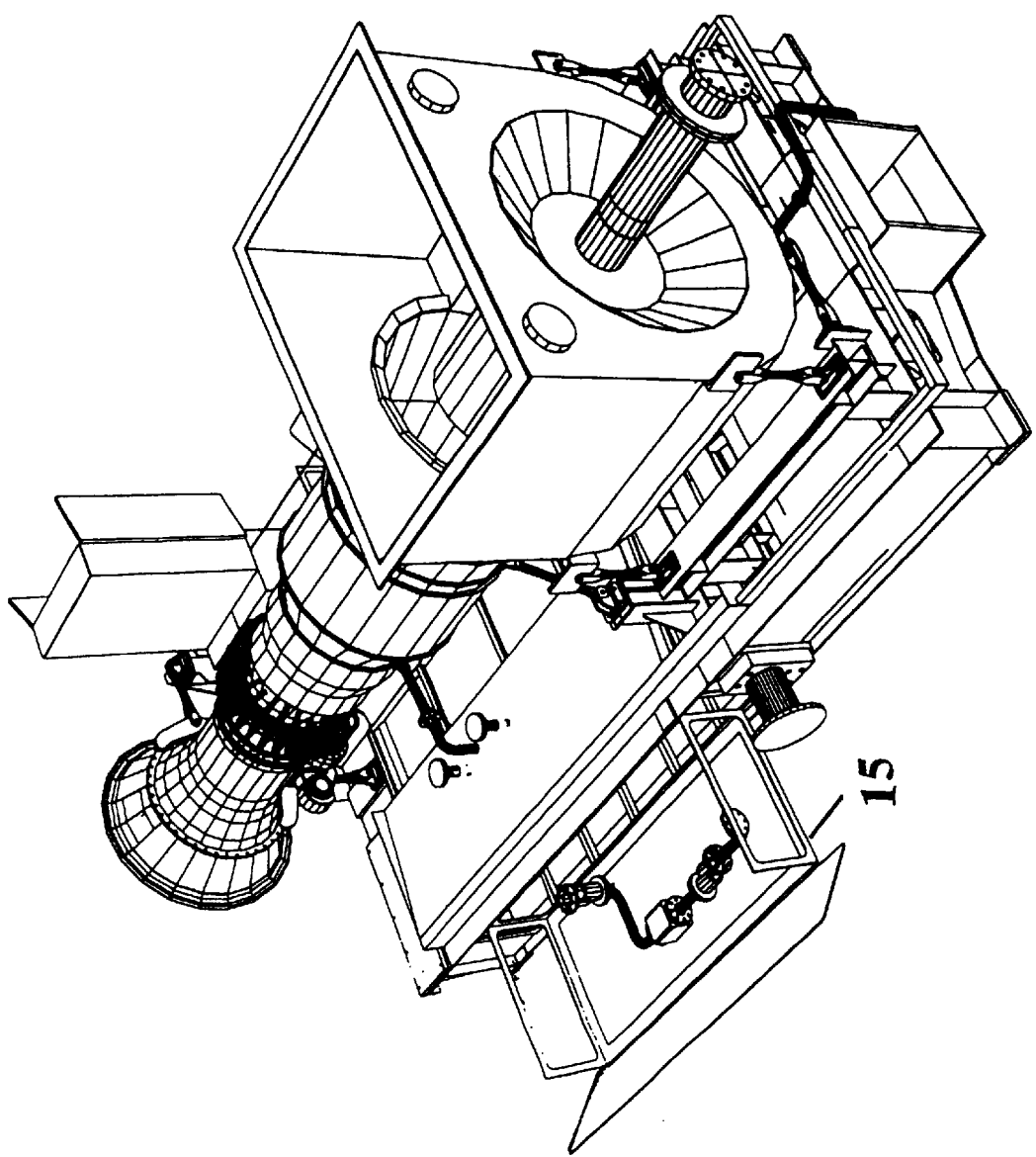

Between the wings 9 and the underside of the plates 10, 11 and 12 one or more chambers 13 are formed on each side of the hollow section 8 which can provide space for different types of modules 15 see FIGS. 5–6.

These modules 15, which are intended to contain the operating and control systems for the gas turbine, that is to say, the fuel gas and hydraulic systems, are provided with wheels or similar sliding or rolling devices to interact with the rails 14 provided in the bottom of the chambers 13. The purpose of this to allow the modules 15 very simply to be pushed in and pulled out of the chambers for maintenance and inspection. Because the central torsion tube is in the form of a rectangular hollow section 8, optimal space is obtained in the chambers 13. The plate-shaped bodies 10, 11 and 12 which wholly or partly cover the top of the base frame 4, at least in the area situated immediately above the chambers 13, will protect the equipment that is placed in the modules 15. The plate-shaped bodies 10, 11 and 12 which preferably consist of steel plates, will, for example, be capable of preventing detached turbine blades from penetrating into the chambers 13, so that a considerably better protection against fire and explosion is obtained than is the case with the solutions used today.

To prevent the equipment located in the modules 15 from being exposed to elevated temperatures, which may be harmful to the equipment, the chambers 13 are mechanically ventilated with the aid of an external ventilation device, and the air change in the chambers 13 is at least 90 changes per minute.

Figure 3:
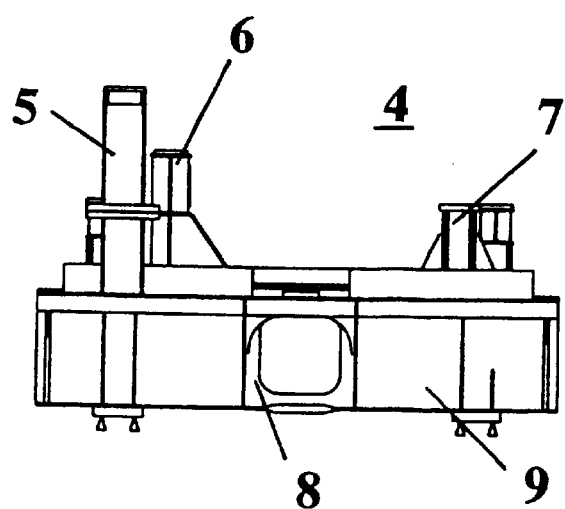
Figure 4:
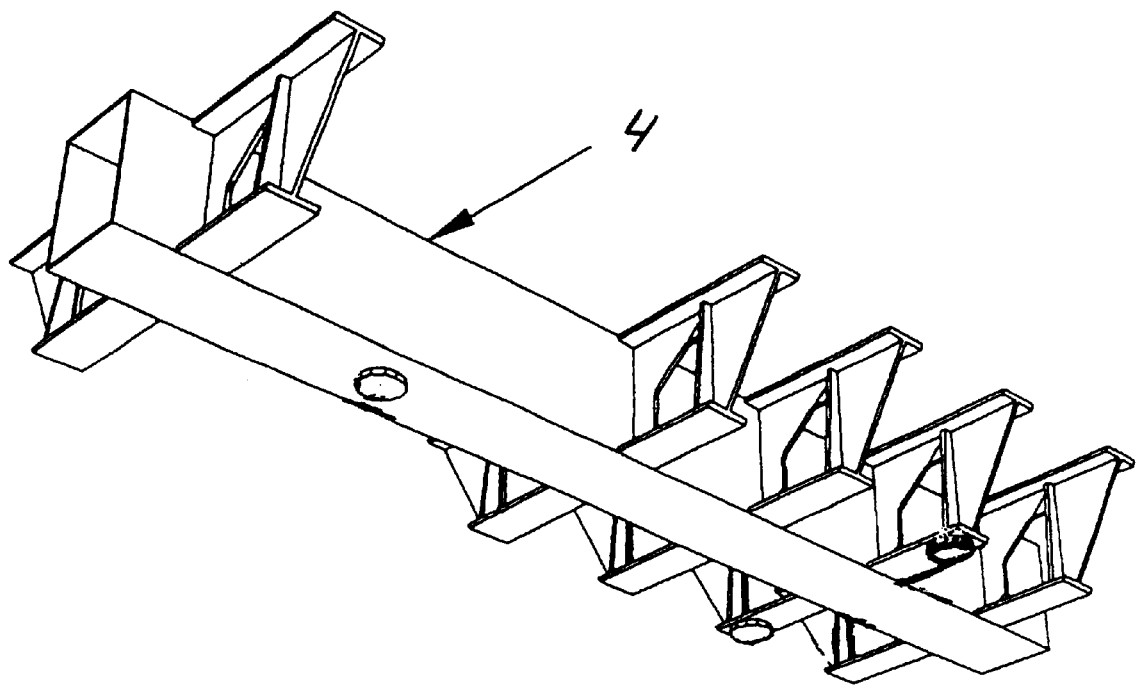
FIG. 4 shows a base frame according to the present invention.

FIG. 4 shows the actual base frame 4, corresponding to the frame shown in FIGS. 1–3, where the plates 10–12 and the chamber 13 have been omitted.

FIGS. 5 and 6 show two embodiments of the base frame according to the present invention, on which there is mounted a gas turbine with driven machinery and hydraulic and fuel gas modules.

What is claimed is:

1. A base frame for a gas turbine comprising:
   a centrally arranged hollow section which acts as a torsion-absorbing body;
   wings which extend from the hollow section and form an angle of approximately 90° with a longitudinal axis of the hollow section,
   one or more plate-shaped bodies arranged to cover wholly or partly the hollow section and the wings,
   wherein between the plate-shaped bodies the wings and the hollow section there is formed at least one chamber on each side of the longitudinal axis of the hollow section,
   said chambers provided with pull-out modules,
   the hollow section being in the form of a hollow section having a rectangularly cross-section.

2. The base frame according to claim 1, wherein:
   the chambers are provided with rails and
   the modules are provided with wheels or sliding or rolling devices which interact with the rails.

3. The base frame according to claim 1, wherein the chambers comprise ventilators sized for mechanically ventilating the chambers to a minimum of 90 air changes per hour.

4. The base frame according to claim 1, further comprising operating and control systems arranged in the modules and connectable to a gas turbine by quick release couplings.

5. The base frame according to claim 1, wherein the base frame further comprises support points to mount a gas turbine and a driven machinery.

6. The base frame according to claim 1, wherein the hollow section extends throughout the entire length of the base frame.

7. The base frame of claim 1, wherein the hollow section has a square cross-section.

8. The base frame of claim 5, wherein the base frame further comprises:
   a turbine mounted on the support points, and
   control equipment mounted within at least one of the modules and operatively connected to the turbine.

* * * * *